(12) United States Patent
Fang et al.

(10) Patent No.: US 10,454,986 B2
(45) Date of Patent: Oct. 22, 2019

(54) VIDEO SYNCHRONOUS PLAYBACK METHOD, APPARATUS, AND SYSTEM

(71) Applicant: TENCENT TECHNOLOGY (SHENZHEN) COMPANY LIMITED, Shenzhen (CN)

(72) Inventors: Liang Fang, Shenzhen (CN); Peng Wang, Shenzhen (CN); Dejun Zhang, Shenzhen (CN); Dawei Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 392 days.

(21) Appl. No.: 15/269,133

(22) Filed: Sep. 19, 2016

(65) Prior Publication Data

US 2017/0006080 A1    Jan. 5, 2017

Related U.S. Application Data

(63) Continuation of application No. PCT/CN2015/075181, filed on Mar. 27, 2015.

(30) Foreign Application Priority Data

Mar. 27, 2014    (CN) .......................... 2014 1 0120053

(51) Int. Cl.
*G06F 15/16* (2006.01)
*H04L 29/06* (2006.01)
(Continued)

(52) U.S. Cl.
CPC .......... *H04L 65/607* (2013.01); *H04L 65/601* (2013.01); *H04L 67/1095* (2013.01);
(Continued)

(58) Field of Classification Search
CPC ..................................................... H04L 65/607
See application file for complete search history.

(56) References Cited

U.S. PATENT DOCUMENTS

| 2004/0214541 | A1  | 10/2004 | Choi |
| 2009/0154556 | A1* | 6/2009  | Kim .................... H04L 65/1083 375/240.02 |

(Continued)

FOREIGN PATENT DOCUMENTS

| CN | 102355606 A | 2/2012 |
| CN | 102457544 A | 5/2012 |

(Continued)

OTHER PUBLICATIONS

Office Action dated Dec. 5, 2017 for Japanese Application No. 2016-558555, 6 pages.

(Continued)

*Primary Examiner* — Kevin T Bates
*Assistant Examiner* — Clarence D McCray
(74) *Attorney, Agent, or Firm* — Brinks Gilson & Lione (57) ABSTRACT

A video synchronous playback system includes: a mobile terminal, a personal computer (PC), an encoding server, a streaming server, and a playback device, where the mobile terminal is configured to capture a current displayed frame of a played video to obtain a first image, perform bitmap scaling processing on the first image to obtain a second image, perform image compression processing on the second image to obtain a third image, and send the third image to the encoding server by using the PC; and the encoding server is configured to restore the third image into a bitmap image to obtain a fourth image, perform bitmap scaling processing on the fourth image to obtain a fifth image, perform format conversion, encoding processing, and encapsulation on the fifth image to obtain a video stream, (Continued)

and send the video stream to a target playback device by using the streaming server.

10 Claims, 3 Drawing Sheets

(51) Int. Cl.
  *H04N 21/41* (2011.01)
  *H04N 21/4402* (2011.01)
  *H04N 21/81* (2011.01)
  *H04L 29/08* (2006.01)
  *H04N 21/2387* (2011.01)
  *H04N 21/43* (2011.01)
(52) U.S. Cl.
  CPC ..... *H04N 21/2387* (2013.01); *H04N 21/4126* (2013.01); *H04N 21/4302* (2013.01); *H04N 21/4402* (2013.01); *H04N 21/8153* (2013.01)

(56) References Cited

U.S. PATENT DOCUMENTS

2010/0135382 A1 6/2010 Kim et al.
2013/0301876 A1* 11/2013 Hugosson .......... G06K 9/00288
  382/103

FOREIGN PATENT DOCUMENTS

| CN | 102665135 A | 9/2012 |
|----|----|----|
| CN | 102811373 A | 12/2012 |
| CN | 103051978 A | 4/2013 |
| EP | 1 758 389 A1 | 2/2007 |
| JP | 2001-197460 A | 7/2001 |
| JP | 2003-333527 A | 11/2003 |
| JP | 2004-328741 A | 11/2004 |
| JP | 2013-009098 A | 1/2013 |

OTHER PUBLICATIONS

Office Action dated Jul. 4, 2017 for Chinese Application No. 201410120053.7, 10 pages.

PCT Notification of Transmittal of International Search Report and Written Opinion in PCT/CN2015/075181, dated Jul. 1, 2016 (3 pgs).

PCT International Search Report in PCT/CN2015/075181, dated Jul. 1, 2016 (4 pgs).

PCT Written Opinion in PCT/CN2015/075181, dated Jul. 1, 2016 (4 pgs).

* cited by examiner

VIDEO SYNCHRONOUS PLAYBACK METHOD, APPARATUS, AND SYSTEM

This application is a continuation application of International Application No. PCT/CN2015/075181, titled "VIDEO SYNCHRONOUS PLAYBACK METHOD, APPARATUS, AND SYSTEM", filed on Mar. 27, 2015, which claims priority to Chinese Patent Application No. 201410120053.7, titled "VIDEO SYNCHRONOUS PLAYBACK METHOD, APPARATUS, AND SYSTEM", filed with the Chinese State Intellectual Property Office on Mar. 27, 2014, both of which are incorporated by reference in their entireties.

FIELD OF THE TECHNOLOGY

The present disclosure relates to the field of communications technologies, and in particular, to a video synchronous playback method, apparatus, and system.

BACKGROUND

When a user watches a video on a mobile phone, if the user wants to watch the video with another user at the same time, the user may transmit a played image of the video to a video playback device used by the another user, so that although the user and the another user are not in a same place, they still can watch the same video at the same time.

In the existing technology, the manner for implementing the foregoing video synchronous playback generally is: A mobile phone captures a video image currently played by the mobile phone, and transmits the image to a personal computer (PC); the PC transmits the image to a streaming server; and the streaming server sends the image to a target playback device. However, the image captured by the mobile phone is large and occupies large bandwidth in the transmission process, a transmission speed is low and causes a large frame latency of the target playback device, and a screen is frequently stuck. Therefore, user experience is poor.

SUMMARY

A video synchronous playback system is disclosed, including: a mobile terminal, a PC, an encoding server, a streaming server, and a playback device; the mobile terminal being connected to the PC by using a universal serial bus (USB), the PC being capable of performing data exchange with the encoding server, the encoding server being capable of performing data exchange with the streaming server, and the streaming server being capable of performing data exchange with the playback device; the mobile terminal being configured to capture a current displayed frame of a played video to obtain a first image, perform bitmap scaling processing on the first image to obtain a second image, perform image compression processing on the second image to obtain a third image, and send the third image to the PC, and the PC sending the third image to the encoding server; and the encoding server being configured to: restore the third image into a bitmap image to obtain a fourth image, perform bitmap scaling processing on the fourth image to obtain a fifth image, perform format conversion, encoding processing, and encapsulation on the fifth image to obtain a video stream, and send the video stream to the streaming server, and the streaming server sending the video stream to a target playback device.

In another aspect, a video synchronous playback method is disclosed including: capturing, by a mobile terminal, a current displayed frame of a played video to obtain a first image, the first image being a bitmap image; performing bitmap scaling processing on the first image according to a current resolution of the mobile terminal to obtain a second image; performing image compression processing on the second image to obtain a third image; and sending the third image to a target playback device.

An encoding server includes: a restoring module, configured to restore a received third image, sent by a mobile terminal, into a bitmap image to obtain a fourth image; a bitmap scaling module, configured to: after the restoring module obtains the fourth image, perform bitmap scaling processing on the fourth image according to a preset resolution to obtain a fifth image; a processing module, configured to: after the bitmap scaling module obtains the fifth image, perform format conversion, encoding processing, and encapsulation on the fifth image to obtain a video stream; and a video stream sending module, configured to: after the processing module obtains the video stream, send the video stream to a target playback device.

DESCRIPTION

Embodiments of the present disclosure are described in the following with reference to the accompanying drawings in the embodiments of the present disclosure. The embodiments in the following description are merely some rather than all of the embodiments. All other embodiments obtained by a person of ordinary skill in the art based on the embodiments of the present disclosure without creative efforts shall fall within the protection scope of the claims.

In the specification, claims, and accompanying drawings of the present disclosure, the terms "first", "second", "third", "fourth", and so on (if existing) are intended to distinguish between similar objects rather than describe a specific order. It should be understood that data used in this way can be exchanged in a proper circumstance, so that the embodiments of the present disclosure can be implemented in other orders except those shown in the figures or described herein. Moreover, the terms "include", "contain" and any other variants mean to cover the non-exclusive inclusion. For example, a process, method, system, product, or device that includes a serial of steps or units is not necessarily limited to those steps or units, but may include other steps or units not expressly listed or inherent to such a process, method, product, or device.

Figure 1:
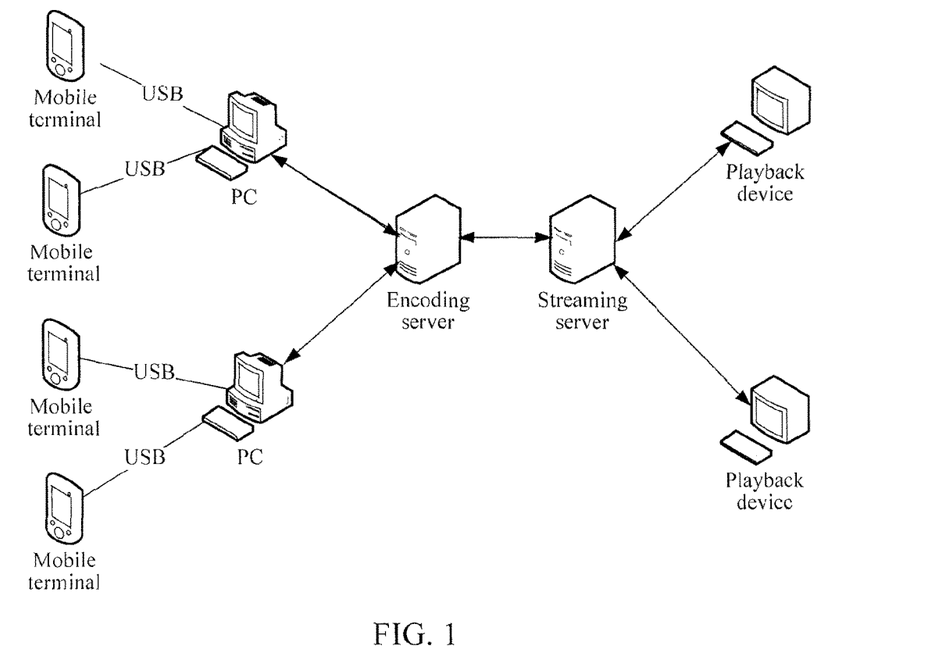
FIG. 1 is a schematic structural diagram of a video synchronous playback system according to an embodiment of the present disclosure.

FIG. 1 is a schematic structural diagram of a video synchronous playback system according to an embodiment, including: a mobile terminal, a PC, an encoding server, a streaming server, and a playback device. The mobile terminal is connected to the PC by using a USB interface. The PC is capable of performing data exchange with the encoding server, the encoding server is capable of performing data exchange with the streaming server, and the streaming server is capable of performing data exchange with the playback device.

In this embodiment, the mobile terminal is configured to capture a current displayed frame of a played video to obtain a first image, perform bitmap scaling processing on the first image to obtain a second image, perform image compression processing on the second image to obtain a third image, and send the third image to the encoding server by using the PC. The mobile terminal obtains the third image by processing the captured first image, so that the data of third image is smaller than the data of the first image, a transmission speed of sending the third image to the encoding server is high, and small bandwidth is occupied.

The encoding server is configured to restore the third image into a bitmap image to obtain a fourth image, perform bitmap scaling processing on the fourth image to obtain a fifth image, perform format conversion, encoding processing, and encapsulation on the fifth image to obtain a video stream, and send the video stream to a target playback device by using the streaming server, so that an image can be displayed on the target playback device, to implement video synchronous playback.

Figure 2:
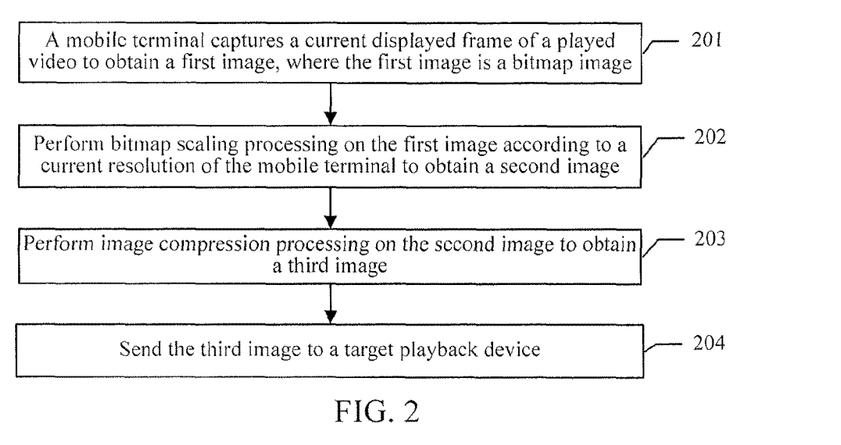
FIG. 2 is a schematic diagram of a video synchronous playback method according to an embodiment of the present disclosure.

FIG. 2 shows an embodiment of a video synchronous playback method, including:

201: A mobile terminal captures a current displayed frame of a played video to obtain a first image, where the first image is a bitmap image.

To implement synchronous video playback between a mobile terminal and a target playback device, while the mobile terminal plays a video, the mobile terminal captures a current displayed frame of the played video to obtain a first image, where the first image is a bitmap image.

202: Perform bitmap scaling processing on the first image according to a current resolution of the mobile terminal to obtain a second image.

The mobile terminal may perform bitmap scaling processing on the first image according to a current resolution of the mobile terminal to obtain a second image. Specifically, the mobile terminal may query a correspondence table between a resolution and a scaling ratio, to determine a scaling ratio corresponding to the current resolution of the mobile terminal, and perform bitmap scaling processing on the first image according to the corresponding scaling ratio to obtain the second image. The correspondence table between a resolution and a scaling ratio is preset in the mobile terminal, and the correspondence table includes a correspondence between a resolution and a scaling ratio, for example, when a screen height is less than or equal to 800 pixels, a corresponding scaling ratio is 1:1; when a screen height is greater than 800 pixels and is less than or equal to 1920 pixels, a corresponding sealing ratio is 2:1; when a screen height is greater than 1920 pixels, a corresponding scaling ratio is 3:1.

When the first image is scaled, it may be feasible not to use any image compression library, but to use a method of interlaced reading or another mathematical algorithm according to a bitmap feature to scale the first image to obtain the second image.

203: Perform image compression processing on the second image to obtain a third image.

After obtaining the second image, the mobile terminal performs image compression processing on the second image to obtain a third image, and may compress the second image into a third image in, for example, a Joint Photographic Experts Group (JPEG) format. It should be noted that, when the second image is compressed, the second image may also be compressed into an image in another format, for example, a Portable Network Graphics (PNG) format.

After the foregoing bitmap scaling and image compression processing, the size of the obtained third image is smaller than the size of the captured first image. In an example in which a resolution of a display of the mobile terminal is 1080*1920, if the size of the second image obtained by performing bitmap scaling on the first image is 8 M, the size of the third image obtained by performing image compression on the second image may be only about 50 K. This can effectively reduce bandwidth occupied for transmitting the third image and increase a transmission speed of the image, thereby achieving a small frame latency and fluent playback on a screen.

204: Send the third image to a target playback device.

After obtaining the third image by compressing the second image, the mobile terminal sends the third image to the target playback device, where the third image can be transmitted to an encoding server by using a PC, and transmitted to the target playback device by using a streaming server after being processed by the encoding server.

Broadly, a mobile terminal captures a current displayed frame of a played video to obtain a first image, where the first image is a bitmap image, performs bitmap scaling processing on the first image according to a current resolution of the mobile terminal to obtain a second image, performs image compression processing on the second image to obtain a third image, and sends the third image to a target playback device. Bitmap scaling and image compression processing are performed on the captured first image, which can effectively reduce the size of the transmitted image, so that bandwidth occupied for transmitting the image is small, a transmission speed is large, a frame latency is small, and playback on a screen is fluent.

Figure 3:
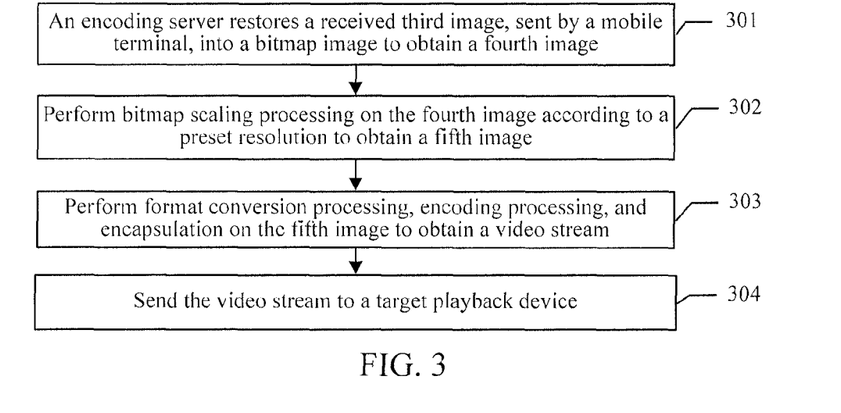
FIG. 3 is another schematic diagram of a video synchronous playback method according to an embodiment of the present disclosure.

A method in which a mobile terminal processes a captured first image to obtain a third image and sends the third image to implement video synchronous playback was described in the embodiment shown in FIG. 2. The following describes a method in which an encoding server processes the third image to obtain a video stream to implement video synchronous playback. FIG. 3 shows an embodiment of a video synchronous playback method, including:

301: An encoding server restores a received third image, sent by a mobile terminal, into a bitmap image to obtain a fourth image.

An encoding server receives a third image that is transmitted by a mobile terminal by using a PC, and the encoding server restores the received third image into a bitmap image to obtain a fourth image, for example; if a format of the third image is a JPEG format, the third image in the JPEG format is converted into a fourth image in a bitmap image format.

302: Perform bitmap scaling processing on the fourth image according to a preset resolution to obtain a fifth image.

The encoding server presets a resolution, and the encoding server performs bitmap scaling processing on the fourth image according to the preset resolution to obtain a fifth image, for example, the preset resolution may be a screen height of 400 pixels, the fourth image is scaled into a fifth image with the screen height of 400 pixels, and an area interpolation method may be used.

Bitmap scaling processing is performed on the fourth image, which can effectively eliminate aliasing of the fourth image.

303: Perform format conversion processing, encoding processing, and encapsulation on the fifth image to obtain a video stream.

304: Send the video stream to a target playback device.

The encoding server further performs format conversion processing, encoding processing, and encapsulation on the fifth image to obtain a video stream, and sends the video stream to a target playback device, where the video stream is forwarded by a streaming server to the target playback device.

The encoding server may perform format conversion on the fifth image by using a formula of conversion from a red, green, blue (RGB) format to a luma and chrominance (YUV) format, to convert the fifth image in the bitmap image into an image in, for example the YUV color space format, and performs encoding processing and encapsulation on the fifth image converted to the YUV format to obtain the video stream.

During encoding processing, encoding may be performed in real time, for example, by using an x264 library (a software library developed by VideoLAN for encoding video streams into the 11.264/MPEG-4 AVC format, distributed on the www under a GNU GPL software license), using parameter settings that may be, for example, an output frame frequency is 25 frames per second, a maximum interval of a key frame is 29 frames, and a constant bit rate.

If an image sent by the mobile terminal is not received within a preconfigured time period after the encoding server sends the video stream, the encoding server may perform frame interpolation processing by using the fourth image. For example, for a mobile phone with an Android 4.X operating system, if a capturing speed fails to reach 15 frames per second, the encoding server may perform frame interpolation processing, and repeatedly send a previously sent video stream every 50 ms, to ensure that a real-time code stream is output.

The encoding server obtains a code stream after performing encoding processing on the fifth image converted to the YUV format, and the encoding server performs Routing Table Maintenance Protocol (RTMP) encapsulation processing on the code stream to obtain the video stream.

In this embodiment after the encoding server sends the video stream, the video stream is forwarded by the streaming server to the target playback device, according to a feature of a Flash capability of playing RTMP, the target playback device may develop a player by using Action Script, a video address may be transmitted by using JavaScript, and a buffer time of the player is set to 0. In addition, the Flash may further load an image of a real mobile phone outline, to display the video stream on a mobile phone screen, which can bring desirable user experience, and facilitate rotate, pause, and full screen operations.

It should be noted that, in the embodiment shown in FIG. 2, for a mobile terminal supporting a Mobile High-Definition Link (MHL) interface, the encoding server may use a High Definition Multimedia Interface (HDMI) video capture card, to obtain a video stream, so that the in the embodiment shown in FIG. 3 may be implemented by means of hardware encoding instead of software encoding.

After receiving a third image that is sent by a mobile terminal by using a PC, an encoding server restores the third image into a bitmap image to obtain a fourth image, and performs bitmap scaling processing on the fourth image according to a preset resolution to obtain a fifth image, and the encoding server performs format conversion processing, encoding processing, and encapsulation on the fifth image to obtain a video stream, and sends the video stream to a target playback device. Bitmap scaling processing is performed on the fourth image, which can effectively eliminate aliasing on the image, so that a played frame is clearer.

Figure 4:
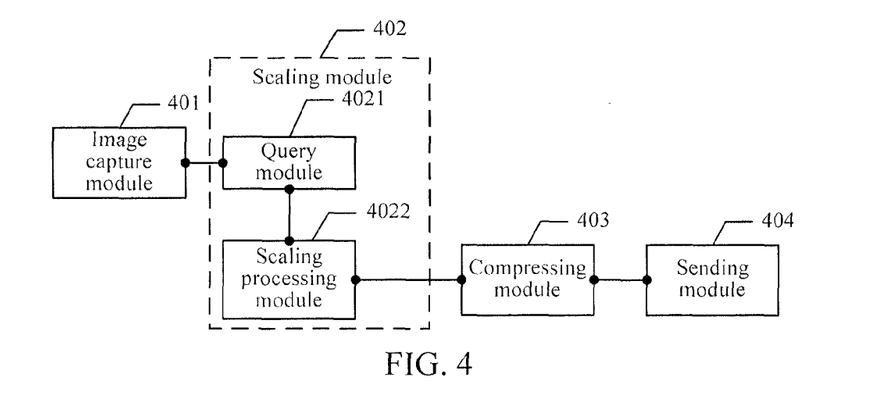
FIG. 4 is a schematic diagram of a mobile terminal according to an embodiment of the present disclosure.

FIG. 4 is a schematic structural diagram of a mobile terminal according to an embodiment of the present disclosure, including:

an image capture module 401, configured to capture a current displayed frame of a played video to obtain a first image, where the first image is a bitmap image;

a scaling module 402, configured to: after the image capture module obtains the first image, perform bitmap scaling processing on the first image according to a current resolution of the mobile terminal to obtain a second image;

a compressing module 403, configured to: after the scaling module obtains the second image, perform image compression processing on the second image to obtain a third image; and a sending module 404, configured to send the third image to a target playback device.

The scaling module 402 includes:

a query module 4021, configured to: after the image capture module 401 obtains the first image, query a correspondence table between a resolution and a scaling ratio, to determine a scaling ratio corresponding to the current resolution of the mobile terminal; and a scaling processing module 4022, configured to: after the query module 4021 determines the corresponding scaling ratio, perform bitmap scaling processing on the first image according to the corresponding scaling ratio to obtain the second image.

The compressing module 403 is specifically configured to compress the second image into a third image in a JPEG format.

The image capture module 401 in the mobile terminal captures a current displayed frame of a played video to obtain a first image, where the first image is a bitmap image; next, the query module 4021 in the scaling module 402 queries a correspondence table between a resolution and a scaling ratio, to determine a scaling ratio corresponding to the current resolution of the mobile terminal; the scaling processing module 4022 performs bitmap scaling processing on the first image according to the corresponding scaling ratio to obtain a second image; next, the compressing module 403 performs image compression processing on the second image to obtain a third image, where specifically, the compressing module 403 compresses the second image into a third image in a JPEG format; and finally, the sending module 404 sends the third image to a target playback device.

A mobile terminal captures a current displayed frame of a played video to obtain a first image, where the first image is a bitmap image, performs bitmap scaling processing on the first image according to a current resolution of the mobile terminal to obtain a second image, performs image compression processing on the second image to obtain a third image, and sends the third image to a target playback device. Bitmap scaling and image compression processing are performed on the captured first image, which can effectively reduce the size of the transmitted image, so that bandwidth occupied for transmitting the image is small, a transmission speed is high, a frame latency is small, and playback on a screen is fluent.

Figure 5:
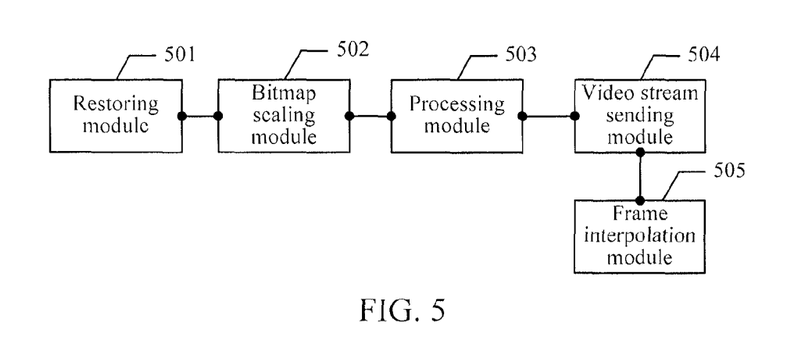
FIG. 5 is a schematic diagram of an encoding server according to an embodiment of the present disclosure.

FIG. 5 is an example of a schematic structural diagram of an encoding server, including:

a restoring module 501, configured to restore a received third image, sent by a mobile terminal, into a bitmap image to obtain a fourth image;

a bitmap scaling module 502, configured to: after the restoring module obtains the fourth image, perform bitmap scaling processing on the fourth image according to a preset resolution to obtain a fifth image;

a processing module 503, configured to: after the bitmap scaling module obtains the fifth image, perform format conversion, encoding processing, and encapsulation on the fifth image to obtain a video stream; and a video stream sending module 504, configured to: after the processing module obtains the video stream, send the video stream to a target playback device.

The encoding server may further include:

a frame interpolation module 505, configured to: if an image sent by the mobile terminal is not received within a preconfigured time period after the encoding server sends the video stream, perform frame interpolation processing by using the fourth image.

The restoring module 501 in the encoding server restores a received third image, sent by a mobile terminal, into a bitmap image to obtain a fourth image; next, the bitmap scaling module 502 performs bitmap scaling processing on the fourth image according to a preset resolution to obtain a fifth image; the processing module 503 performs format conversion, encoding processing, and encapsulation on the fifth image to obtain a video stream; and the video stream sending module 504 sends the video stream to a target playback device. In addition, if an image sent by the mobile terminal is not received within a preconfigured time period after the encoding server sends the video stream, the frame interpolation module 505 performs frame interpolation processing by using the fourth image.

After receiving a third image that is sent by a mobile terminal by using a PC, an encoding server restores the third image into a bitmap image to obtain a fourth image, and performs bitmap scaling processing on the fourth image according to a preset resolution to obtain a fifth image, and the encoding server performs format conversion processing, encoding processing, and encapsulation on the fifth image to obtain a video stream, and sends the video stream to a target playback device. Bitmap scaling processing is performed on the fourth image, which can effectively eliminate aliasing on the image, so that a played frame is clearer.

Figure 6:
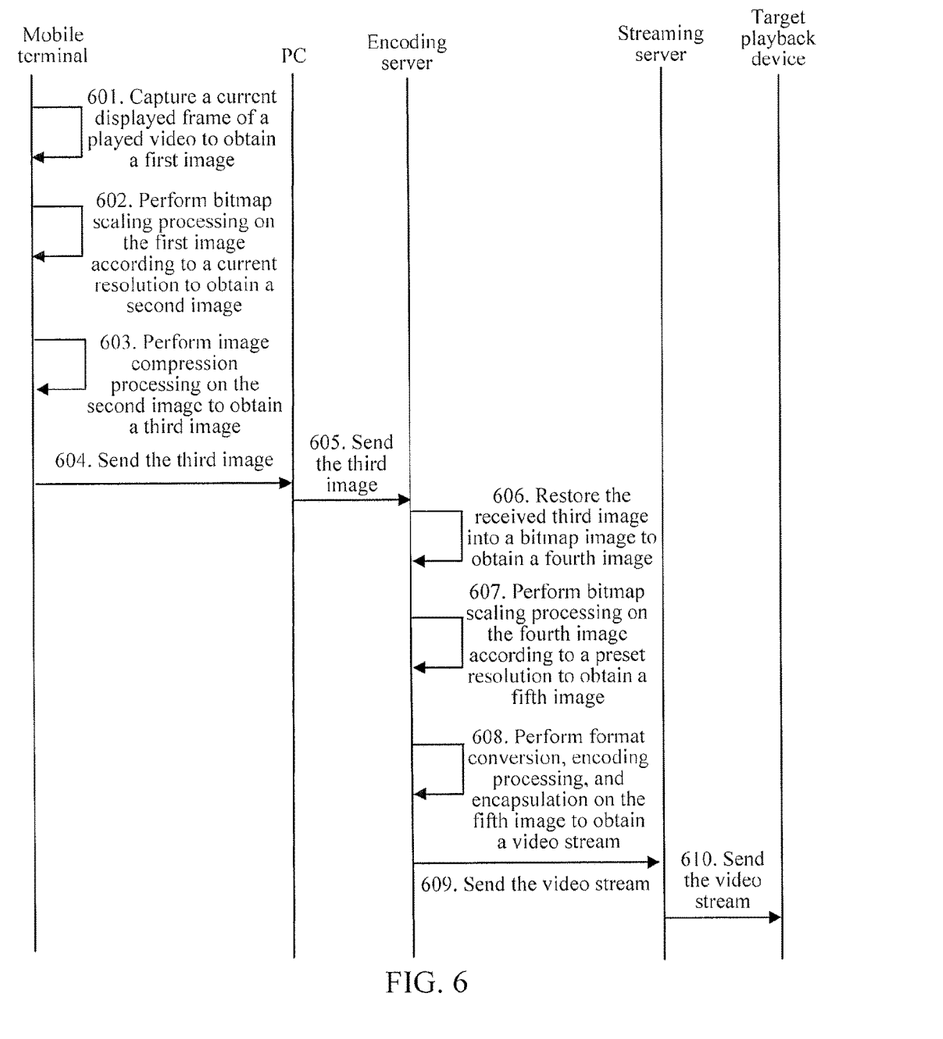
FIG. 6 is a schematic diagram of an interaction method for video synchronous playback in a video synchronous playback system according to an embodiment of the present disclosure.

To better understand the video synchronous playback method in the embodiments of the present disclosure, the following describes, based on the video synchronous playback system described in the embodiment shown in FIG. 1, an interaction process of devices in the system in video synchronous playback. Referring to FIG. 7, the process includes:

601: A mobile terminal captures a current displayed frame of a played video to obtain a first image, where the first image is a bitmap image.

To implement synchronous video playback between a mobile terminal and a target playback device, while the mobile terminal plays a video, the mobile terminal captures a current displayed frame of the played video to obtain a first image, where the first image is a bitmap image.

602: The mobile terminal performs bitmap scaling processing on the first image according to a current resolution of the mobile terminal to obtain a second image.

The mobile terminal may perform bitmap scaling processing on the first image according to a current resolution of the mobile terminal to obtain a second image. In an aspect, the mobile terminal may query a correspondence table between a resolution and a scaling ratio, to determine a scaling ratio corresponding to the current resolution of the mobile terminal, and perform bitmap scaling processing on the first image according to the corresponding scaling ratio to obtain the second image. The correspondence table between a resolution and a scaling ratio may be preset in the mobile terminal, and the correspondence table includes a correspondence between a resolution and a scaling ratio; for example, when a screen height is less than or equal to 800 pixels, a corresponding scaling ratio is 1:1; when a screen height is greater than 800 pixels and is less than or equal to 1920 pixels, a corresponding scaling ratio is 2:1; when a screen height is greater than 1920 pixels, a corresponding scaling ratio is 3:1.

When the first image is sealed, it may be feasible not to use any image compression library, but to use a method of interlaced reading or another mathematical algorithm according to a bitmap feature to scale the first image to obtain the second image.

603: The mobile terminal performs image compression processing on the second image to obtain a third image.

After obtaining the second image, the mobile terminal performs image compression processing on the second image to obtain a third image, and specifically may compress the second image into a third image in a JPEG format. It should be noted that, when the second image is compressed, the second image may also be compressed into an image in another format, for example, PNG.

After the foregoing bitmap scaling and image compression processing, the size of the obtained third image is far smaller than the size of the captured first image. In an example in which a resolution of a plane of the mobile terminal is 1080*1920, if the size of the second image obtained by performing bitmap scaling on the first image is 8 M, the size of the third image obtained by performing image compression on the second image may be only about 50 K. This can effectively reduce bandwidth occupied for transmitting the third image and increase a transmission speed of the image, thereby achieving a small frame latency and fluent playback on a screen.

604: The mobile terminal sends the third image to a PC.

After obtaining the third image, the mobile terminal may send the third image to the PC by using a USB interface between the mobile terminal and the PC.

605: The PC sends the third image to an encoding server.

After obtaining the third image, the PC sends the third image to an encoding server. Because the third image is an image processed by the mobile terminal, the image is small, bandwidth occupied by the PC to transmit the image to the encoding server is small, and a transmission speed is large.

606: The encoding server restores the received third image, sent by the mobile terminal, into a bitmap image to obtain a fourth image.

An encoding server receives the third image that is transmitted by the mobile terminal by using the PC, and the encoding server restores the received third image into a bitmap image to obtain a fourth image, for example, if a format of the third image is a JPEG format, the third image in the JPEG format is converted into a fourth image in a bitmap image format.

607: The encoding server performs bitmap scaling processing on the fourth image according to a preset resolution to obtain a fifth image.

The encoding server presets a resolution, and the encoding server performs bitmap sealing processing on the fourth image according to the preset resolution to obtain a fifth image; for example, the preset resolution is a screen height of 400 pixels, the fourth image is scaled into a fifth image with the screen height of 400 pixels, and specifically an area interpolation method may be used.

Bitmap scaling processing is performed on the fourth image, which can effectively eliminate aliasing of the fourth image.

608: The encoding server performs format conversion, encoding processing, and encapsulation on the fifth image to obtain a video stream.

The encoding server further performs format conversion processing, encoding processing, and encapsulation on the fifth image to obtain a video stream, where the encoding server may perform format conversion on the fifth image by using a formula of conversion from an RGB format to a YUV format, to convert the fifth image in the bitmap image into an image in the YUV format, and performs encoding processing and encapsulation on the fifth image converted to the YUV format to obtain the video stream.

During encoding processing, encoding may be performed in real time by using an x264 library, where the parameter settings may be that an output frame frequency is 25 frames per second, a maximum interval of a key frame is 29 frames, and a constant bit rate.

In an aspect, if an image sent by the mobile terminal is not received within a preconfigured time period after the encoding server sends the video stream, the encoding server performs frame interpolation processing by using the fourth image. For example, for a mobile phone with an Android 4.X system, if a capturing speed fails to reach 15 frames per second, the encoding server performs frame interpolation processing, and repeatedly sends a previously sent video stream every 50 ms, to ensure that a real-time code stream is output.

The encoding server obtains a code stream after performing encoding processing on the fifth image converted to the YUV format, and the encoding server performs RTMP encapsulation processing on the code stream to obtain the video stream.

609: The encoding server sends the video stream to a streaming server.

610: The streaming server sends the video stream to a target playback device.

After obtaining the video stream, the encoding server may send the video stream to the streaming server. Because the image is processed by the mobile terminal and the encoding server, the video stream is small, bandwidth occupied for sending the video stream is small, and a transmission speed is large.

After receiving the video stream, the streaming server determines a target playback device of the video stream, and sends the video stream to the target playback device. Because bandwidth occupied in the process of sending the third image and the video stream is small and a transmission speed is large, playback of the target playback device is more fluent.

A person of ordinary skill in the art may understand that all or some of the steps of the method according to the foregoing embodiments may be implemented by a program instructing relevant hardware such as a processor of a server. The program may be stored in a computer readable storage medium, and the storage medium may be a read-only memory, a magnetic disk, an optical disc, or the like.

The video synchronous playback method, apparatus, and system provided by the present disclosure are described above in detail. A person of ordinary skill in the art may make modifications to the specific implementation manners and application scopes according to the ideas of the embodiments of the present disclosure. In conclusion, the claims should not be construed as being limited to the present disclosure.

What is claimed is:

1. A video synchronous playback system, comprising:
a mobile terminal, a personal computer (PC), an encoding server, a streaming server, and a playback device;
the mobile terminal being connected to the PC by using a universal serial bus (USB), the PC being capable of performing data exchange with the encoding server, the encoding server being capable of performing data exchange with the streaming server, and the streaming server being capable of performing data exchange with the playback device;
the mobile terminal being configured to capture a current displayed frame of a played video to obtain a first image, perform bitmap scaling processing on the first image to obtain a second image, perform image compression processing on the second image to obtain a third image, and send the third image to the PC, and the PC sending the third image to the encoding server; and
the encoding server being configured to: after receiving the third image, restore the third image into a bitmap image to obtain a fourth image, perform bitmap scaling processing on the fourth image to obtain a fifth image, perform format conversion, encoding processing, and encapsulation on the fifth image to obtain a video stream, and send the video stream to the streaming server, and the streaming server sending the video stream to a target playback device.

2. A video synchronous playback method, comprising:
capturing, by a mobile terminal, a current displayed frame of a played video to obtain a first image, the first image being a first bitmap image;
performing bitmap scaling processing on the first image according to a current resolution of the mobile terminal to obtain a second image;
performing image compression processing on the second image to obtain a third image;
sending the third image from the mobile terminal to an encoding server;
receiving the third image by the encoding server;
restoring, by the encoding server, the received third image, into a second bitmap image to obtain a fourth image;
performing bitmap scaling processing on the fourth image according to a preset resolution to obtain a fifth image;
performing format conversion, encoding processing, and encapsulation on the fifth image to obtain a video stream;
and
sending the image video stream to a target playback device.

3. The method according to claim 2, wherein the performing bitmap scaling processing on the first image according to a current resolution of the mobile terminal to obtain a second image comprises: querying a correspondence table between a resolution and a scaling ratio, to determine the scaling ratio corresponding to the current resolution of the mobile terminal; and performing bitmap scaling processing on the first image according to the corresponding scaling ratio to obtain the second image.

4. The method according to claim 2, wherein the performing image compression processing on the second image to obtain a third image comprises: compressing the second image into a third image in a Joint Photographic Experts Group (JPEG) format.

5. The method according to claim 2, further comprising: performing, by the encoding server if an image sent by the mobile terminal is not received within a preconfigured time period after the encoding server sends the video stream, frame interpolation processing by using the fourth image.

6. An encoding server, comprising:
an interface configured to receive a first video image that has been bitmap scaled by a mobile terminal to form second image and compression processed by a mobile terminal to form a second image: and one or more processors executing instruction modules, the instruction modules comprising:
a restoring module, configured to restore a received third image, into a bitmap image to obtain a fourth image;
a bitmap scaling module, configured to:
after the restoring module obtains the fourth image, perform bitmap scaling processing on the fourth image according to a preset resolution to obtain a fifth image;
a processing module, configured to: after the bitmap scaling module obtains the fifth image, perform format conversion, encoding processing, and encapsulation on the fifth image to obtain a video stream; and
a video stream sending module, configured to: after the processing module obtains the video stream, send the video stream to a target playback device.

7. The encoding server according to claim 6, further comprising:
a frame interpolation module, configured to:
if an image sent by the mobile terminal is not received within a preconfigured time period after the encoding server sends the video stream, perform frame interpolation processing by using the fourth image.

8. The video synchronous playback system according to claim 1, wherein the second image through the fifth image are sequentially derived from the first image.

9. The video synchronous playback method according to claim 2, wherein the second image through the fifth image are sequentially derived from the first image.

10. The encoding server according to claim 6, wherein the second image through the fifth image are sequentially derived from the first image.

* * * * *